3,094,459
WOOD PRESERVATIVE
James H. Pickren, P.O. Box 628, Jacksonville, Fla.
No Drawing. Filed Mar. 1, 1960, Ser. No. 11,949
11 Claims. (Cl. 167—38.5)

This invention relates to the preservation of wood, and more particularly relates to wood preservative compositions and their preparation. Still more particularly, this invention relates to wood preservatives having substantial non-corrosive and non-sludge characteristics when used in connection with ferrous metal equipment, and to the method of preparing said compositions.

The wood preserving properties of acid cupric chromate are disclosed in the U.S. Patent to Gunn, No. 1,684,222, granted Sept. 11, 1928. In the Gunn patent the preservative contains potassium dichromate and copper sulfate dissolved in water in a 1 to 1 ratio by weight and acidified with acetic acid or chromic acid for controlling the pH of the solution.

Through many years of extensive use it has been learned that copper sulfate causes corrosion to ferrous equipment such as storage tanks, pipes, pumps, valves and treating cylinders, for example. In particular, a serious accumulation of sludge results from contact of the preservative with metallic iron, causing a highly undesirable precipitate of ferric sulfate which is insoluble in the wood preservative solution. Moreover, at concentrations of 3% or more by weight of solute, or at pH values of 4.0 or greater, acid cupric chromate seriously precipitates from the wood preservative solution.

As a result of the attack of the solution on iron equipment, ferric ions are precipitated out as ferric sulfate in the presence of excess sulfate ions provided in the copper sulfate initially present. As the corrosion process continues, the acid factor (pH value) of the solution progressively increases toward a pH of about 4.7. When the pH value reaches about 4.0 to 4.1, acid cupric chromate begins to precipitate from the solution thereby creating even more sludge and depleting the strength of the preservative solution by reducing the availability in the solution of this valuable wood preservative component.

Accordingly, it is an object of this invention to provide a wood preservative composition and a method of preparation thereof whereby the corrosive action of an acid cupric chromate solution on a ferrous metal container is either entirely prevented or greatly inhibited.

It is another object of this invention to provide a wood preservative composition and a method for the preparation thereof wherein the essential preservative components of the composition are wholly soluble and afford a preservative solution that is clean and deposits no slimy residue upon the treated wood.

It is another object of this invention to provide a wood preservative composition and a method for the preparation thereof whereby all the essential preservative components thereof are kept available in the solution thereby affording a maximum preservative effect.

It is another object of this invention to provide a wood preservative composition and a method for the preparation thereof whereby a much more uniform penetration of the wood to be treated is achieved, owing to the absence of a deposit of sludge within the intercellular interstices of the wood.

Other objects and attendant advantages of this invention, including the simplicity and economy of the same, and the manner in which it may be applied to preservative solutions of varying percentage composition, will become further apparent hereinafter.

I have discovered that an adjustment of the acidity of a copper chromate wood preservative solution can be made with an organic acid, namely citric acid, so that any acid cupric chromate which has been precipitated as an insoluble salt in the solution will be re-dissolved so that the solution becomes and remains clear and so that all of the effective preservative components remain available in the solution.

I have discovered, moreover, that a suitable adjustment of the pH of the preservative solution can be made upward, when desired, by the addition of ammonium hydroxide in the presence of citric acid without further re-precipitation of acid cupric chromate so that at such higher pH values, and in the presence of this particular combination of reagents, there is little or no corrosive action on metallic equipment, including iron, ordinarily used in connection with the treatment of wood by such preservative.

In accordance with this invention a solution of a concentration of at least 3% by weight of solute is prepared by dissolving a copper salt and an alkali metal dichromate in water. At a concentration of solute of 3%, or greater, acid cupric chromate tends to precipitate out of the solution. Accordingly, to the solution as prepared, there is added citric acid in sufficient quantity to re-dissolve any acid cupric chromate which has prematurely precipitated. Upon the addition of citric acid to the preservative solution, as aforesaid, not only is any precipitate of acid cupric chromate re-dissolved but the pH of the solution is also lowered proportionately to the quantity of citric acid introduced. The preservative solution as prepared and used in accordance with this invention may be formulated within the following ranges of percentage composition:

|  | Percent by weight |
| --- | --- |
| Copper sulfate | 0.5–3.0 |
| Alkali metal dichromate | 0.5–3.0 |
| Water | 99.0–94.0 |
| Citric acid | .01–0.1 |
| Ammonium hydroxide (conc.) | .01–0.1 |

It will be clear that in the foregoing formulation appropriate concentrations of gaseous ammonia may be substituted for liquid ammonium hydroxide, and it is intended that the equivalence of the two terms should be understood throughout this application.

Ordinarily, in the practice of this invention, I prefer to use $CuSO_4 \cdot 5H_2O$ and $Na_2Cr_2O_7 \cdot 2H_2O$ to prepare the initial solution of copper chromate preservative, although the invention is in no way limited to these compounds. Ordinarily also, I prefer to prepare an initial solution having a pH value within the range of about 4.0 to about 4.1. The quantity of citric acid that is added to the preservative solution is preferably proportional in each case to the concentration of solute in the initial water solution of copper salt and alkali metal dichromate.

*Example 1*

As a specific example of a method of preparing a wood preservative composition in accordance with this invention, a solution of copper chromate was prepared by dissolving 3 parts by weight of copper sulfate $\cdot 5H_2O$ and 3 parts by weight of sodium dichromate $\cdot 2H_2O$ in 194 parts by weight of water. The measured pH of the resulting solution was 4.1. At this pH acid cupric chromate precipitated. To 100 parts by weight of the resulting solution were added 0.0163 part by weight of citric acid whereupon the precipitate of acid cupric chromate completely re-dissolved. The measured value of the pH of the solution after the addition of citric acid was 3.9.

*Example 2*

Although the preservative composition resulting from the addition of citric acid in Example 1 and having a pH of 3.9 has been found to have valuable and effective preservative properties in the treatment of wood and can be used advantageously for that purpose, it is usually more desirable to adjust the pH of the final preservative solution to a valve as high as, or higher than, that of the initial solution of copper sulfate and sodium dichromate in order to minimize even more greatly any possible corrosive effect upon metallic equipment that the acidified preservative composition might have at the lower pH. To the acidified preservative composition of Example 1, sufficient ammonium hydroxide was added to raise the pH to 4.7, i.e., 0.6 above the initial pH of the copper chromate solution. Although the pH of the preservative composition was moved upward by the addition of ammonium hydroxide, subsequent to the addition of citric acid, there was no evidence of any precipitation of acid cupric chromate at the higher pH of 4.7, either in the presence of or in the absence of iron.

*Example 3*

As a practical formula for plant use, I prefer the following optimum proportions:

| | Weight |
|---|---|
| Copper sulphate, $X5H_2O$ | 1.5 grams. |
| Sodium dichromate, $X2H_2O$ | 1.5 grams. |
| Citric acid | 20.0 milligrams (min.). |
| Ammonium hydroxide | 28.0 milligrams (max.). |
| Water up to | 100.0 cc. |

It will be clear that while a minimum quantity of citric acid must be added in order to lower the pH of the copper chromate solution sufficiently to re-dissolve any precipitated acid cupric chromate, an upper limit upon the amount of citric acid to be added is unnecessary, particularly where the pH is later adjusted to a value within the range to give optimum preservative effectiveness. However, as hereinbefore indicated, an upper limit of approximately 0.1% [1] may be imposed upon the quantity of citric acid introduced into the preservative solution whenever such an upper limit is deemed necessary.

After the addition of ammonium hydroxide to the preservative solution and the adjustment of the pH to the desired value, it has been observed that the pH of the preservative composition remains constant within a small range of tolerances in the practical use thereof in connection with metallic equipment of various kinds, including iron. At the same time re-precipitation of acid cupric chromate is entirely avoided as a result of the equilibrium set up between ammonium ions, excess sulfate ions and ammonium sulfate within the solution.

The following formulas represent further specific examples of a wood preservative composition formulated and prepared in accordance with this invention.

*Example 4*

(1)

| | Percent by weight |
|---|---|
| Copper sulfate | 0.5– 3.0 |
| Alkali metal dichromate | 0.5– 3.0 |
| Water | 99.0–94.0 |
| Citric acid | 0.01– 0.1 |
| Ammonium hydroxide (conc.) | 0.01– 0.1 |

(2)

| | By weight |
|---|---|
| Copper sulphate, $X5H_2O$ | 1.5 grams. |
| Sodium dichromate, $X2H_2O$ | 1.5 grams. |
| Citric acid | 20.0 milligrams (min.). |
| Ammonium hydroxide | 28.0 milligrams (max.). |
| Water up to | 100.0 cc. |

(3)

| | Parts by weight |
|---|---|
| Copper sulphate, $X5H_2O$ | 1.5 |
| Sodium dichromate, $X2H_2O$ | 1.5 |
| Water | 96.97 |
| Citric acid | 0.015 |
| Liquid ammonium hydroxide | 0.015 |

[1] By weight, based upon the total weight of the solution.

(4)

| | |
|---|---|
| Copper sulphate, $X5H_2O$ | 1.5 |
| Sodium dichromate, $X5H_2O$ | 1.5 |
| Water | 96.96 |
| Citric acid | 0.020 |
| Liquid ammonium hydroxide | 0.020 |

(5)

| | |
|---|---|
| Copper sulphate, $X5H_2O$ | 1.5 |
| Sodium dichromate, $X2H_2O$ | 1.5 |
| Water | 96.90 |
| Citric acid | 0.050 |
| Liquid ammonium hydroxide | 0.050 |

(6)

| | |
|---|---|
| Copper sulphate, $X5H_2O$ | 2.5 |
| Sodium dichromate, $X2H_2O$ | 1.5 |
| Water | 95.95 |
| Citric acid | 0.025 |
| Liquid ammonium hydroxide | 0.025 |

(7)

| | |
|---|---|
| Copper sulphate, $X5H_2O$ | 1.0 |
| Sodium dichromate, $X2H_2O$ | 1.5 |
| Water | 97.46 |
| Citric acid | 0.020 |
| Liquid ammonium hydroxide | 0.020 |

(8)

| | |
|---|---|
| Copper sulphate, $X5H_2O$ | 1.5 |
| Sodium dichromate, $X2H_2O$ | 2.5 |
| Water | 95.95 |
| Citric acid | 0.025 |
| Liquid ammonium hydroxide | 0.025 |

(9)

| | |
|---|---|
| Copper sulphate, $X5H_2O$ | 1.5 |
| Sodium dichromate, $X2H_2O$ | 1.0 |
| Water | 97.46 |
| Citric acid | 0.020 |
| Liquid ammonium hydroxide | 0.020 |

(10)

| | |
|---|---|
| Copper sulphate, $X5H_2O$ | 1.0 |
| Sodium dichromate, $X2H_2O$ | 1.0 |
| Water | 97.96 |
| Citric acid | 0.020 |
| Liquid ammonium hydroxide | 0.020 |

(11)

| | |
|---|---|
| Copper sulphate, $X5H_2O$ | 2.5 |
| Sodium dichromate, $X2H_2O$ | 2.5 |
| Water | 94.90 |
| Citric acid | 0.050 |
| Liquid ammonium hydroxide | 0.050 |

(12)

| | |
|---|---|
| Copper sulphate, $X5H_2O$ | 1.5 |
| Potassium dichromate | 1.5 |
| Water | 96.97 |
| Citric acid | 0.015 |
| Liquid ammonium hydroxide | 0.015 |

(13)

| | |
|---|---|
| Copper sulphate, $X5H_2O$ | 1.5 |
| Potassium dichromate | 1.5 |
| Water | 96.96 |
| Citric acid | 0.020 |
| Liquid ammonium hydroxide | 0.020 |

(14)

| | |
|---|---|
| Copper sulphate, $X5H_2O$ | 1.5 |
| Potassium dichromate | 1.5 |
| Water | 96.90 |
| Citric acid | 0.050 |
| Liquid ammonium hydroxide | 0.050 |

(15)

| | |
|---|---|
| Copper sulphate, $X5H_2O$ | 2.5 |
| Potassium dichromate | 1.5 |
| Water | 95.95 |
| Citric acid | 0.025 |
| Liquid ammonium hydroxide | 0.025 |

(16)

| | |
|---|---|
| Copper sulphate, $X5H_2O$ | 1.0 |
| Potassium dichromate | 1.5 |
| Water | 97.46 |
| Citric acid | 0.020 |
| Liquid ammonium hydroxide | 0.020 |

(17)

| | |
|---|---|
| Copper sulphate, $X5H_2O$ | 1.5 |
| Potassium dichromate | 2.5 |
| Water | 95.95 |
| Citric acid | 0.025 |
| Liquid ammonium hydroxide | 0.025 |

(18)

| | |
|---|---|
| Copper sulphate, $X5H_2O$ | 1.5 |
| Potassium dichromate | 1.0 |
| Water | 97.46 |
| Citric acid | 0.020 |
| Liquid ammonium hydroxide | 0.020 |

(19)

| | |
|---|---|
| Copper sulphate, $X5H_2O$ | 1.0 |
| Potassium dichromate | 1.0 |
| Water | 97.96 |
| Citric acid | 0.020 |
| Liquid ammonium hydroxide | 0.020 |

(20)

| | |
|---|---|
| Copper sulphate, $X5H_2O$ | 2.5 |
| Potassium dichromate | 2.5 |
| Water | 94.90 |
| Liquid ammonium hydroxide | 0.050 |
| Citric acid | 0.050 |

In some cases it is desirable to add chromic acid or chromium acetate in small quantities to the original solution of copper sulfate and sodium dichromate in order to adjust the initial pH of the solution within the desired range. Subsequently citric acid and ammonium hydroxide may be added in exactly the same way as before:

*Example 21*

| | Parts by weight |
|---|---|
| Copper sulphate, $X5H_2O$ | 1.50 |
| Sodium dichromate, $X2H_2O$ | 1.50 |
| Chromium acetate | 0.25 |
| Citric acid | 0.02 |
| $NH_4OH$ (liquid) | 0.02 |
| Water (balance) | 96.71 |
| | 100.00 |

*Example 22*

| | Parts by weight |
|---|---|
| Copper sulphate, $X5H_2O$ | 1.50 |
| Potassium dichromate, $X2H_2O$ | 1.50 |
| Chromium acetate | 0.25 |
| Citric acid | 0.02 |
| $NH_4OH$ (liquid) | 0.02 |
| Water (balance) | 96.71 |
| | 100.00 |

Accordingly, it will be appreciated that in accordance with this invention, the citric acid and ammonium hydroxide act both as a buffer for the pH control of the solution and for maintaining the acid cupric chromate in solution for availability as a wood preservative in an available condition. Further, this combination prevents the formation of sludge and at the same time acts as an inhibitor against corrosion on iron or other metal equipment.

Although I do not desire or intend to be limited to a specific chemical principle, it is my present opinion that the invention may be explained by the fact that the citric acid prevents the acid cupric chromate from precipitating and the ammonium hydroxide ties up the excess sulphate ions, thus eliminating the corrosion and sludging that were heretofore experienced. Although it would appear from an examination of the chemical reactions involved that ammonium citrate and ammonium sulphate are the end products of the reaction, I have found that the addition of ammonium citrate and ammonium sulphate does not produce the same results that are produced by the addition of citric acid and ammonium hydroxide. The results achieved by adding ammonium citrate and ammonium sulphate are definitely inferior. I believe that this is caused at least partially by the fact that when ammonium citrate is used, the acid cupric chromate is not completely prevented from precipitating and the sulphate ion does not react with the ammonium citrate that has already been tied up.

If ammonium sulphate is used, the same condition is found as with ammonium citrate, and furthermore, additional sulphate ions are added to the further detriment of the working solution. Moreover, when ammonium citrate or ammonium sulphate are used originally, I have found by actual measurements that the pH value slowly increases, which indicates corrosion and attack upon the iron.

It will further be appreciated that, when citric acid is used as a buffer for the acid cupric chromate, followed by treatment with ammonium hydroxide, the pH can be allowed to rise substantially above the 4.1 value without experiencing any precipitation of the acid cupric chromate, whereas acid cupric chromate had precipitated at a pH of 4.1 when prior processes were used.

It will be appreciated that a very important advantage is realized in the practice of this invention by virtue of the combined effect of inhibiting or preventing the corrosive effect of the preservative upon metallic equipment and at the same time preventing any precipitation of acid cupric chromate from the solution, whereby the production of sludge is substantially eliminated. The elimination of such sludge yields a two-fold advantage, first, in that there is avoided a serious attack on metal equipment and an undesirable deposit of slimy residue upon the treated wood, and second, in that a much more uniform penetration of the treated wood is achieved than would be otherwise possible. Moreover, the preservative composition, as formulated and prepared in accordance with this invention, by reason of the buffering action which prevents the precipitation of acid cupric chromate, keeps available in solution all of the essential preservative components, thereby greatly enhancing the strength and effectiveness of the composition.

Although this invention has been described with reference to various specific forms thereof, it will be appreciated that equivalent method steps and chemicals may be utilized without departing from the spirit and the scope of the invention. For example, departures may be made in both materials and processes with respect to the specific components of the composition and the percentages and proportions thereof, as well as the specific steps and type of process, all without departing from the spirit and scope of this invention as defined in the appended claims.

Having thus described my invention, I claim:

1. In a method of preparing a wood preservative composition the steps which comprise dissolving substantially equal parts by weight of copper sulfate and an alkali metal dichromate in water in an amount to produce a solution having a pH within the range of about 4.0 to about 4.1 and adding citric acid to said solution in a quantity to reduce said pH to about 3.5.

2. In a method of preparing a wood preservative composition the steps which comprise dissolving substantially equal parts by weight of copper sulfate and an alkali metal dichromate in water in an amount to produce a solution having a pH within the range of about 4.0 to about 4.1 and adding citric acid to said solution in a ratio by weight of about .02 part of citric acid to each 3 parts of dissolved solute.

3. The method defined in claim 2 wherein the relative quantities are 1.5 grams of copper sulfate and 1.5 grams of an alkali metal dichromate, 97 grams of water and .02 gram of citric acid.

4. In the method of preparing a wood preservative composition wherein substantially equal parts by weight of a copper salt and an alkali metal dichromate are dissolved in water in an amount to produce a solution from which copper chromate is precipitated, the novel step of adding citric acid to said solution in a quantity to cause said precipitate to re-dissolve.

5. In a method of preparing a wood preservative composition the steps wihch comprise dissolving substantially equal parts by weight of copper sulfate and an alkali metal dichromate in water in an amount to produce a solution having a pH within the range of about 4.0 to 4.1, adding citric acid to said solution in a quantity to reduce said pH to about 3.5, and then adding ammonium hydroxide to said solution in a quantity to increase said pH to within the range of about 4.6 to about 4.7.

6. The composition defined in claim 5 wherein ammonium ions, excess sulfate ions and ammonium sulfate are maintained in equilibrium in said solution.

7. An aqueous wood preservative solution consisting essentially of copper sulfate, an alkali metal dichromate, citric acid and ammonium hydroxide, said citric acid and ammonium hydroxide being present in a proportion to prevent the precipitation of copper chromate from said solution, said solution having a pH of about 4.0 to 4.8.

8. In a method of preparing a wood preservative composition the steps which comprise dissolving substantially equal parts by weight of copper sulfate and an alkali metal dichromate in water, reducing the pH of said solution by adding citric acid thereto, and then adjusting the pH of said solution to a value within the range of about 4.0 to about 4.8 thereof by adding ammonia thereto.

9. In a method of preparing a wood preservative composition the steps which comprise dissolving substantially equal parts by weight of copper sulfate and an alkali metal dichromate in water, adding a quantity of citric acid to said solution in an amount to adjust the pH thereof to a value within the range of about 3.5 to about 3.8, and then adding a quantity of ammonium hydroxide to said solution in an amount to adjust the pH thereof to a value within the range of about 4.0 to about 4.8.

10. A wood preservative composition having a pH within the range of about 4.0 to about 4.8 and consisting essentially of:

| | Percent by weight |
|---|---|
| Copper sulfate | 0.5–3.0 |
| Alkali metal dichromate | 0.5–3.0 |
| Water | 99.0–94.0 |
| Citric acid | 0.01–0.1 |
| Ammonium hydroxide (conc.) | 0.01–0.1 |

11. In a method of preserving wood in a ferrous metal container which is subject to corrosive attack by copper sulfate and alkali metal dichromate wood preserving chemicals, the novel method of preserving such wood notwithstanding the presence of such corrosive chemicals, which method comprises adding citric acid to said chemicals in an amount to reduce the pH, then adding ammonia in an amount to raise the pH to about 4.0 to about 4.8, and then immersing said wood in the resulting solution while maintaining said solution in said ferrous metal container.

References Cited in the file of this patent
UNITED STATES PATENTS

| 1,346,830 | Lambert | July 20, 1920 |
| 1,684,222 | Gunn | Sept. 11, 1928 |
| 2,149,332 | Boller | Mar. 7, 1939 |
| 2,325,359 | Arnold | July 27, 1943 |
| 2,816,057 | Cook | Dec. 10, 1957 |